(12) United States Patent
White

(10) Patent No.: US 9,441,538 B2
(45) Date of Patent: Sep. 13, 2016

(54) ENGINE USABLE AS A POWER SOURCE OR PUMP

(75) Inventor: William Llewis White, Christchurch (NZ)

(73) Assignee: Grace Motor Works Limited, Christchurch (NZ)

( * ) Notice: Subject to any disclaimer, the term of this patent is extended or adjusted under 35 U.S.C. 154(b) by 0 days.

(21) Appl. No.: 13/825,932

(22) PCT Filed: Sep. 30, 2011

(86) PCT No.: PCT/NZ2011/000205
§ 371 (c)(1),
(2), (4) Date: Apr. 18, 2013

(87) PCT Pub. No.: WO2012/044185
PCT Pub. Date: Apr. 5, 2012

(65) Prior Publication Data
US 2013/0199465 A1    Aug. 8, 2013

(30) Foreign Application Priority Data
Sep. 30, 2010   (NZ) ........................................ 588122

(51) Int. Cl.
| | |
|---|---|
| F02B 3/04 | (2006.01) |
| F01B 9/06 | (2006.01) |
| F02B 75/00 | (2006.01) |
| F02B 59/00 | (2006.01) |
| F02B 75/26 | (2006.01) |
| F04B 9/04 | (2006.01) |
| F04B 41/04 | (2006.01) |
| F16H 25/14 | (2006.01) |

(Continued)

(52) U.S. Cl.
CPC ............... *F02B 75/002* (2013.01); *F01B 5/00* (2013.01); *F02B 59/00* (2013.01); *F02B 75/265* (2013.01); *F04B 9/042* (2013.01); *F04B 41/04* (2013.01); *F16H 25/14* (2013.01); *F02B 43/00* (2013.01)

(58) Field of Classification Search
CPC .......... F02B 3/06; F02B 53/00; F02B 75/04; F02B 75/22; F01C 21/0836; F01B 9/06; F01B 3/04; F01B 1/0606; F01B 3/0005; F01L 1/08; F01L 1/267
USPC ........... 123/43 C, 197.1, 197.2, 197.3, 197.4
See application file for complete search history.

(56) References Cited

U.S. PATENT DOCUMENTS

| | | | | |
|---|---|---|---|---|
| 2,183,507 A | * | 12/1939 | Schmitter | ...................... 475/194 |
| 2,417,894 A | * | 3/1947 | Wayland | ...................... 123/43 C |
| 3,730,150 A | * | 5/1973 | Codner, Jr. | ......... F01L 13/0042 123/90.18 |

(Continued)

FOREIGN PATENT DOCUMENTS

| | | |
|---|---|---|
| AU | 849627 | 2/1928 |
| EP | 0964136 A1 | 12/1999 |

(Continued)

*Primary Examiner* — Marguerite McMahon
*Assistant Examiner* — Tea Holbrook
(74) *Attorney, Agent, or Firm* — Larson & Anderson, LLC

(57) ABSTRACT

An engine which includes a rotor mounted relative to an output shaft, the rotor having one or more piston cylinder assembly's disposed in or on the rotor. The longitudinal axis/axes of the one or more piston cylinder assembly's is orientated to be tangential to a peripheral rim of the rotor. The rotor or output shaft has a lobed cam which rotates at the same, greater or slower speed than the rotor and in which via compression and combustion, each piston rotates the rotor continuously relative to a stationary part of the engine.

26 Claims, 1 Drawing Sheet

(51) Int. Cl.
*F01B 5/00* (2006.01)
*F02B 43/00* (2006.01)

(56) References Cited

U.S. PATENT DOCUMENTS

| | | | | |
|---|---|---|---|---|
| 3,747,574 | A * | 7/1973 | Bland | 123/21 |
| 3,939,808 | A * | 2/1976 | Kostecki et al. | 123/43 R |
| 4,487,085 | A * | 12/1984 | Collins | F16H 29/04 |
| | | | | 74/113 |
| 5,390,558 | A * | 2/1995 | Weinberg | F16H 29/04 |
| | | | | 74/119 |
| 6,705,202 | B2 * | 3/2004 | Harcourt et al. | 92/56 |
| 6,928,965 | B2 * | 8/2005 | Teufl | 123/43 R |
| 6,988,441 | B2 * | 1/2006 | Harcourt et al. | 92/56 |
| 2002/0070619 | A1 * | 6/2002 | Nishiyama et al. | 310/156.53 |
| 2003/0051681 | A1 * | 3/2003 | Harcourt et al. | 123/43 R |
| 2003/0192496 | A1 * | 10/2003 | Walters | F01L 1/34 |
| | | | | 123/90.18 |
| 2004/0163532 | A1 * | 8/2004 | Harcourt et al. | 92/56 |
| 2009/0272094 | A1 * | 11/2009 | Zink et al. | 60/39.35 |
| 2012/0053817 | A1 * | 3/2012 | Gauthier et al. | 701/102 |
| 2012/0313466 | A1 * | 12/2012 | Eisert et al. | 310/62 |
| 2013/0233259 | A1 * | 9/2013 | Courson | 123/54.3 |

FOREIGN PATENT DOCUMENTS

| | | |
|---|---|---|
| GB | 1260112 | 1/1972 |
| WO | 0142624 A2 | 6/2001 |

* cited by examiner

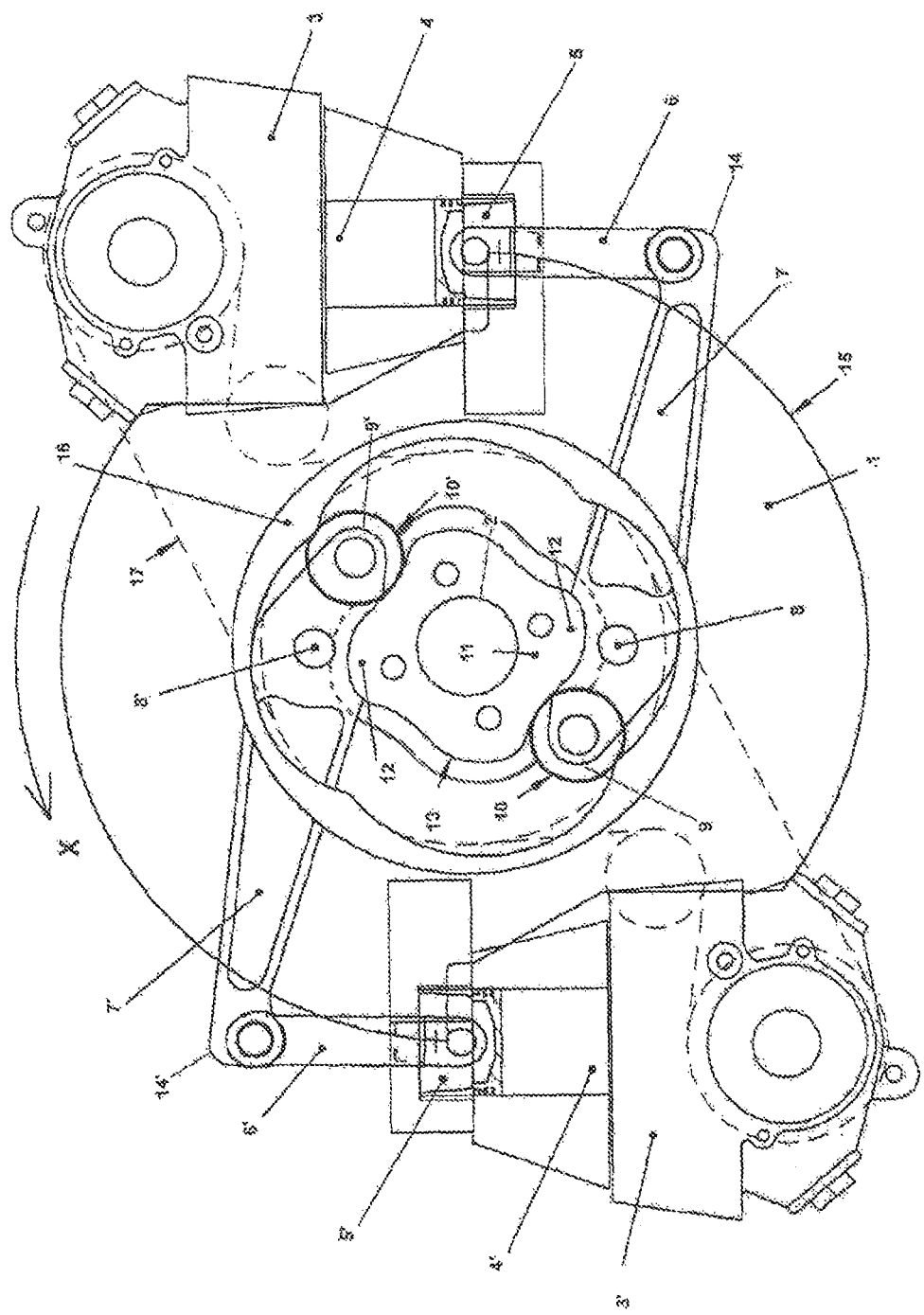

ENGINE USABLE AS A POWER SOURCE OR PUMP

CROSS-REFERENCE TO RELATED CASES

The present application is a national stage application of PCT/NZ2011/000205 filed on Sep. 30, 2011, which claims priority to New Zealand patent application no. 588122 filed on Sep. 30, 2010, all of which are incorporated herein by reference for all purposes.

FIELD OF THE INVENTION

The invention relates to engines and in particular to engines that may be used either as a power source or as a pump.

BACKGROUND TO THE INVENTION

It is a recognised that most piston engines are inherently inefficient. A number of factors are responsible for this inefficiency including the motion of the pistons, and the fact that at times each piston is either at rest or in a drag state which therefore reduces the amount of energy available at the crank of the engine. Also energy is required to move a piston to the top of its bore during each compression or pump stroke.

A further cause of inefficiency in an existing internal combustion engine is that energy is used to operate gears, cams and other equipment necessary to enable the engine to function. This use of energy results in reduced efficiency, and in the final analysis only a small percentage of input energy is transferred as output from an engine.

Rotary type engines overcome some of the above problems. However, rotary engines are complex and sealing problems exist between the moving parts. While rotary engines have dramatically changed the design of standard piston and cylinder engines they have resulted in complex sealing and design problems which can result in reliability problems.

Hybrid engines are another type of known engine. An example of a hybrid engine is described in EP0964136, which is a rotary type engine configuration with the engine's block defining a cylindrical rotor having a plurality of bores which open to combustion chambers near the periphery of the engine block. A piston is disposed in each bore. Each piston has its own crank with rotation transferred to the engine block/rotor via a planetary gear arrangement. Inlet ports, spark plugs and outlet ports are arranged around the periphery of the engine housing in the same manner as a conventional rotary engine. The advantage claimed for this configuration of engine is that the power/movement of the pistons is almost completely converted to rotational movement of the engine and thus it produces a greater power output per size/weight than a conventional piston engine. A further advantage is that the rotary nature of the engine does away with the need to employ valves and thus the associated problem of valve damage in conventional engines is eliminated. Such an engine still suffers from considerable sealing problems and losses in the planetary gearbox linking the piston rods to the rotor.

Another hybrid engine is described in AU 8496/27. This engine is of a type that has a continuously rotating group of cylinders disposed tangentially on a main rotatable member. Corresponding pistons are intermittently rotating. The pistons are attached to piston levers pivoted about the centre of rotation. In order to achieve correct operation of this engine the pistons must be locked against movement in either direction during combustion so that energy can be transferred to the rotatable member via the cylinders. After combustion the piston must accelerate at twice the speed of the rotary member in order to move back to top dead centre for the next combustion stroke. A sophisticated arrangement of gears and levers is therefore required to operate the pistons in this manner. Because the pistons must travel at twice rotational speed the engine's maximum speed is limited by the ability to move the pistons from standstill to top dead centre.

As well as the above mentioned disadvantages, in existing piston engines, the time the piston spends at the top and bottom of its stroke is very short as the crankshaft operates to change direction at the instant that the extreme of piston travel is reached. This reduces dwell and leads to incomplete burning of gases in the combustion chamber. These incompletely burnt gases are expelled in the exhaust resulting in inefficiencies in the engine and pollution of the atmosphere.

Accordingly it is an object of the present invention to provide an engine which is efficient and economical to run. It is a further object of the present invention to provide an engine which has high rotational inertia and torque relative to its size and weight.

It is still a further object of the present invention to provide an engine which can be controlled in a variety of ways to meet a variety of functional needs.

Yet a further object of the present invention is to provide an engine which ameliorates some of the disadvantages of known engines, or at least provides the public with a useful alternative choice.

SUMMARY OF THE INVENTION

In a first aspect the invention provides for an engine including a rotor mounted relative to an output shaft, the rotor having one or more piston cylinder assembly's disposed in or on the rotor with the longitudinal axis/axes of the one or more piston cylinder assembly's orientated to be tangential to a peripheral rim of the rotor, the rotor or output shaft having a lobed cam which rotates at the same, greater or slower speed than the rotor and wherein via compression and combustion, each piston rotates the rotor continuously relative to a stationary part of the engine.

Each piston cylinder assembly has a piston or connecting rod connected to a lever member mounted relative to the rotor at a fulcrum or rocking point which is offset from the axis of the rotor and output shaft. Each lever member has at its proximal end a roller or the like adapted in use to contact the lobed cam.

The stroke length in one embodiment of the engine can be adjusted as required to increase or decrease engine output.

In one example an armature of annular design can be secured to the rotor and a stationary winding or other structure placed radially concentric to it, to thereby provide a means for electric power generation which does not require any mechanisms external to the engine to generate electricity.

It would be readily understood by a skilled addressee that phase correction can be mechanically arranged to suit engine speed and visa versa.

An alternate or synchronous use can be to mount a centrifugally disposed fluid pump/filter on the rotor so as to create a centrifugally induced flow through the pump/filter via the rotation of the rotor. The centrifugally cleaned fluid can then be heated to a predetermined temperature by a cooling system of a fluid cooled variant of the engine. Thus, via the rotation of the engine, electricity generation and filtered hot fluid can be derived as a result.

The invention will now be described with reference to its use as an internal combustion engine. Use of the engine as a pump is not excluded and such use is within the ability to be attributed to the skilled addressee.

BRIEF DESCRIPTION OF THE DRAWING

An example of the invention will now be described with reference to the accompanying FIG. 1 which shows a cross section through a four stroke example of engine according to the invention.

DESCRIPTION OF A PREFERRED EXAMPLE

An example of engine according to the invention is shown in FIG. 1. Although the following description is of the unit usable as an engine it is to be appreciated that a skilled address would appreciate that the unit can be used as a pump.

The engine includes a rotor 1 mounted in relation to a suitable housing not shown. The rotor 1 is mounted on an output shaft 2. The rotor 1 has in the example a pair of cylinders 3, 3' mounted so that their longitudinal axes are tangential to the periphery of the rotor 1. It is to be appreciated that more than two cylinders can be mounted on the rotor as is required. The rotor 1 is in effect acting as a flywheel to create added inertia to the engine while it operates. Each cylinder 3, 3' has mounted in a bore 4, 4' a piston 5, 5'. Each cylinder 3, 3' and its associated piston 5, 5' can be a standard piston cylinder assembly. The pistons 5, 5' each have a piston or connecting rod 6, 6' respectively connected to a lever member 7, 7'. An articulated connecting rod (not shown) could alternatively be used in each cylinder to linearise connecting rod movement within the cylinder.

Each of the lever members 7, 7' is mounted relative to the rotor 1 at a fulcrum or rocking point 8, 8' which is offset from the axis of the rotor 1 and output shaft 2. Each lever member 7, 7' has at its proximal end 9 a roller or the like 10, 10'.

Concentric with and at the centre of the rotor 1 is a lobed cam 11. In the example the lobed cam 11 has four lobes 12 on its outer surface 13.

In a first embodiment the lobed cam 11 is stationary so that rotor 1, lever members 7, 7' and their associated pistons 5, 5' rotate.

It will be appreciated by the skilled addressee that the present engine operates differently to conventional engines because during combustion, movement of the pistons 5, 5' is controlled, thereby causing the cylinders 3, 3', which are disposed on the rotor 1 to move. This causes rotation of the rotor 1 and output shaft 2. In the illustrated example the direction of movement is shown by arrow X.

As the cylinders 3, 3' and rotor 1 rotate the lever members 7, 7' rotate because their fulcrum points 8, 8' are eccentrically positioned. The rollers 10, 10' follow the surface 13 of the lobed cam 11 thereby communicating motion to the lever members 7, 7'. The fulcrum points 8, 8' of, the lever members 7, 7' are closer to the proximal end 9 than to a connecting rod end 14, 14' thereof. This means that relatively speaking a small movement of the proximal ends 9, 9' results in the connecting rod ends 14, 14' moving a larger distance.

The cylinders 3, 3' on the rotor 1 are mounted with their longitudinal axes tangential to the periphery 15 thereof.

It will be appreciated by the skilled addressee that in certain circumstances rollers 10, 10' may not follow the surface 13 of the cam 11 and in this case it may be necessary to hold the rollers 10, 10' in contact with the surface by including an outer journal or collar 16 to provide a surface which substantially parallel's the surface profile of the cam 11.

In use as the rollers 10, 10' follow the surface 13 of the cam 11 the pistons 5, 5' move in the bores 4, 4' of the cylinders 3, 3'. As the rollers 10, 10' move onto the lobes 12 the pistons 5, 5' are moved to top dead centre of the bores 4, 4'. Fuel and air for combustion is introduced before the pistons 5, 5' reach top dead centre and the compressed fuel/air mixture is ignited in known manner by ignition means not shown. Contrary to the way a standard engine operates and as the pistons 5, 5' cannot move backwards the combustion of the fuel results in the cylinders 3, 3' moving away from the pistons 5, 5' thereby causing the rotor 1 to move in the direction of arrow X resulting in rotation of the output shaft 2.

As pistons 5, 5' are pivotably disposed on rotor 1, via piston lever members 7, 7' they continuously rotates with the rotor 1. The speed and motion and their position, relative to cylinders 3, 3' can be controlled by the shaping of lobes 12 on cam 11 and thus the time taken for pistons 5, 5' to go from top dead centre (TDC) to bottom dead centre within the cylinders 5, 5' can be lengthened or shortened to manage the effective energy stroke experienced by rotor 1.

While the illustrated embodiment utilises a cam 11 disposed concentric with rotor 1 it is possible that an embodiment of the engine can utilise two or more dams 11 disposed adjacent proximal ends 9, 9' of the lever members 7, 7'. The two or more piston controllers could be linked and timed by gears or a timing belt and communicate motion individually to their adjacent lever members 7, 7'. This arrangement would be suitable for an engine with a large diameter rotor 1 and would enable shorter lever members 7, 7' to be utilised. While such an embodiment is possible it is not preferred as it introduces additional gears and timing mechanisms and thus reduces the simplicity of the engine.

An advantage of the invention is that the cam 11 rotates at the same speed and in the direction of rotation as all the other moving components or faster when an increase in power output from the engine is required.

Yet another advantage of the engine is that the engine can, in effect, "free wheel" with the rotor turning while no other parts of the engine are moving. The compression ratio of the engine can be increased or decreased as required.

It will also be apparent to the skilled addressee that an engine according to the invention could operate as either a two or four stroke engine.

FIG. 1 illustrates a four stroke fluid cooled engine, although the design contemplates more or less strokes than are illustrated, and/or air cooling. The four piston strokes are suction, compression, combustion (or expansion) and exhaust strokes. It will be appreciated by the skilled addressee that in the embodiment shown in FIG. 1 rollers 10 and 10' ride up onto lobes 12 simultaneously forcing both pistons 5 and 5' to top dead centre at, or approximately at, the same time. A timing belt (shown by dashed line—17) can control operation of the cylinder head valves (not shown). A typical arrangement could therefore be such that when piston 5 was on a compression stroke diametrically opposite piston 5' would be on an exhaust stroke. It would also be appreciated by the skilled addressee that using the engine configuration it is possible to run as a four stroke engine with the piston cylinder assemblies firing sequentially or synchronously.

It will also be apparent to the skilled addressee that any number of cylinders can be disposed around rim 15 of rotor 1 and that by appropriate timing of valves, ignition spark and positioning of lobes 12 on cam 11 a variety of firing sequences can be achieved. Timing for the ignition spark can be via a mechanical-type distributor directly driven from the axis of rotor 1 or via a gear on timing belt, or be of compression ignition design.

Alternatively, an electronic-type distributor can utilise a transducer adapted to detect the angular position of rotor 1 or cam 11 to create ignition.

Due to the design of the engine it is suitable for "waste to energy" type fuels, and thus could have variable spark intensity derived from multiple sparkplugs mounted within each combustion chamber, and the synchronous delivery of either the same or variable fuels via multiple fuel injectors mounted in each combustion chamber, all of which could be engaged or disengaged at will, according to demand.

This design contemplates the possibility of a synchronous and perhaps constantly varying supply of quality or mixture of compression and or spark ignited fuels, and via a "knock detection" system could evaluate fuel balance requirements and arrange subsequent engine settings as the fuel is being consumed.

In practice the number of cylinders that can be disposed around a single rotor 1 is limited by physical size and complexity in overlapping lever members for engagement with the cam 11. In a more practical arrangement one or more rotors 1 carrying two cylinders each can be disposed along a common output shaft 2 to produce a 2, 4, 6 etc cylinder engine as desired. It should also be appreciated that the engine can have only one cylinder. In a single cylinder embodiment rotor 1 must be counterbalanced by a weight or weights opposite the cylinder, piston and lever member.

In an alternative construction (not shown) the cam 11 can be rotatable axially relative to the rotor 1 to thereby adjust the dwell timing of the pistons 5, 5' in their bores 4, 4' to thereby adjust power output from the engine if additional power is required. This is in effect a variable speed crankcase operated engine, which derives it's energy from the rotor via the cylinder heads and generally stationary piston lever cam.

In yet another alternative construction the stroke length of the engine can be adjusted by replacing the cylindrical rollers 10, 10' with spherical or curved surface rollers, and the cam surfaces 13 with ramps, tapered in side elevation, while the peaks which contact the rollers 9 are flat. Put another way the major diameter of the cam surface 13 remains constant while the ramps may be progressively tapered on the inner or outer facing, peaking at the minor diameter between lobes. Axial movement of the cam 11 allows the point of contact of the roller 9, 9' relative to the cam surface 13 to be different thus altering the stroke length by forcing the piston to travel further down its bore, but always bringing the pistons to TDC at the same place, and thereby power output is adjustable up or down as is required.

Another advantage of the invention is that the pistons 5, 5' are at top dead centre at or approximately at the same place.

Where in the description particular mechanical integers are described it will be appreciated that a skilled addressee with recognize that their alternatives can be substituted therefore.

Particular examples of the invention have been described and it is envisaged that improvements and modifications can take place without departing from the scope of the attached claims.

The invention claimed is:

1. An engine including,
   a rotor mounted relative to an output shaft, the rotor having one or more piston cylinder assembly's disposed in or on the rotor with the longitudinal axis/axes of the one or more piston cylinder assembly's orientated to be tangential to a peripheral rim of the rotor, the rotor or output shaft having a lobed cam which rotates at the same, greater, or slower speed than the rotor,
   each said piston cylinder assembly having a piston connected to a distal end of a lever member mounted relative to the rotor at a fulcrum or rocking point which is offset from an axis of the rotor and output shaft, the lever member at a proximal end bears on the lobed cam,
   wherein the lobed cam has a cam surface which is tapered in side elevation, so that axial movement of the lobed cam allows the point of contact of the proximal end to the cam surface to be varied to thereby alter the stroke length up or down as required, and
   wherein via combustion, each piston moves within its cylinder to rotate the rotor continuously relative to a not necessarily stationary part of the engine.

2. The engine as claimed in claim 1 wherein the geometry of the fulcrum or rocking point can be varied.

3. The engine as claimed in claim 2 wherein each lever member has at its proximal end a roller adapted in use to contact the cam surface of the lobed cam.

4. The engine as claimed in claim 3 wherein the lobed cam is rotateable axially relative to the rotor to thereby adjust the dwell timing of the piston(s) in its(their) bore(s) to thereby adjust power output from the engine if additional power is required.

5. The engine as claimed in claim 1 wherein two or more lobed cams are disposed adjacent proximal ends of the lever members, the two or more lobed cams being linked and timed by gears or a timing belt and communicate motion individually to their adjacent lever members.

6. The engine as claimed in claim 1 wherein the pistons come to TDC at the same place so that power output is adjustable up or down as is required.

7. The engine as claimed in claim 1 wherein each piston cylinder assembly has an articulated connecting rod to linearise connecting rod movement within the cylinder.

8. The engine as claimed in claim 1 wherein the stroke length can be adjusted as required to increase or decrease output.

9. The engine as claimed in claim 1 wherein the cam is disposed concentric with rotor.

10. The engine as claimed in claim 1 in which an armature of annular design is secured to the rotor and a stationary winding is placed radially concentric to it, to thereby provide a means for electric power generation which does not require any mechanisms external to the engine to generate electricity.

11. The engine as claimed in claim 1 wherein one or more similar rotors carrying two cylinders each is disposed along a common output shaft to produce a 2, 4, 6 or more cylinder engine as desired.

12. The engine as claimed in claim 1, wherein each piston cylinder assembly has an articulated connecting rod to linearize its movement from the lever member within the cylinder.

13. The engine as claimed in claim 1 wherein each lever member has at its proximal end a spherical or curved surface roller to follow said cam surface which is tapered, and the peaks which contact the rollers are flat.

14. The engine of claim 1, wherein:
the lobed cam has a length extending along its rotational axis and the cam surface is tapered along the length of the lobed cam; and
axial movement of the lobed cam along its rotational axis allows the point of contact of the proximal end to the cam surface to be varied to thereby alter the stroke length up or down as required.

15. A pump including,
a rotor mounted relative to an output shaft, the rotor having one or more piston cylinder assembly's disposed in or on the rotor with the longitudinal axis/axes of the one or more piston cylinder assembly's orientated to be tangential to a peripheral rim of the rotor, the rotor or output shaft having a lobed cam which rotates at the same, greater, or slower speed than the rotor,
each said piston cylinder assembly having a piston connected to a distal end of a lever member mounted relative to the rotor at a fulcrum or rocking point which is offset from an axis of the rotor and output shaft, the lever member at a proximal end bears on the lobed cam,
wherein the lobed cam has a cam surface which is tapered in side elevation, so that axial movement of the lobed cam allows the point of contact of the proximal end to the cam surface to be varied to thereby alter the stroke length up or down as required, and
wherein via rotation of the rotor continuously relative to a stationary part of the pump, compression by the piston forms a pump.

16. The pump as claimed in claim 15 wherein each piston cylinder assembly has the piston or a connecting rod connected to the piston, connected to a lever member mounted relative to the rotor at a fulcrum or rocking point which is offset from the axis of the rotor and output shaft.

17. The pump as claimed in claim 16 wherein each lever member has at its proximal end a roller adapted in use to contact the lobed cam.

18. The pump as claimed in claim 17 wherein the lobed cam is rotateable axially relative to the rotor to thereby adjust the dwell timing of the piston(s) in its(their) bore(s) to thereby adjust power output from the pump if additional power is required.

19. The pump as claimed claim 17 wherein two or more lobed cams are disposed adjacent proximal ends of the lever members, the two or more lobed cams being linked and timed by gears or a timing belt and communicate motion individually to their adjacent lever members.

20. The pump as claimed in claim 16 wherein each lever member has at its proximal end a spherical or curved surface roller, and the lobed cam surfaces are ramps, tapered in side elevation, while the peaks which contact the rollers are flat so that axial movement of the cam allows the point of contact of the roller relative to the cam surface to be different to thereby alter the stroke length by forcing the piston to travel further down its bore while always bringing the pistons to TDC at the same place so that power output is adjustable up or down as is required.

21. The pump as claimed in claim 15 wherein each piston cylinder assembly has an articulated connecting rod to linearise connecting rod movement within the cylinder.

22. The pump as claimed in claim 15 wherein the stroke length can be adjusted as required to increase or decrease output.

23. The pump as claimed in claim 15 wherein the cam is disposed concentric with rotor.

24. The pump as claimed in claim 15 in which an armature of annular design is secured to the rotor and a stationary winding is placed radially concentric to it, to thereby provide a means for electric power generation which does not require any mechanisms external to the engine to generate electricity.

25. The pump as claimed in claim 15 wherein one or more similar rotors carrying two cylinders each is disposed along a common output shaft to produce a 2, 4, 6 or more cylinder engine as desired.

26. The pump of claim 15, wherein:
the lobed cam has a length extending along its rotational axis and the cam surface is tapered along the length of the lobed cam; and
axial movement of the lobed cam along its rotational axis allows the point of contact of the proximal end to the cam surface to be varied to thereby alter the stroke length up or down as required.

* * * * *